United States Patent

[11] 3,632,364

[72] Inventors Richard E. Thomas
Chicago;
Robert T. Florence, Park Ridge; Rustom H. Dalal, Chicago; Raymond I. Scheuer, Lindenhurst, all of Ill.
[21] Appl. No. 757,067
[22] Filed Sept. 3, 1968
[45] Patented Jan. 4, 1972
[73] Assignee A. B. Dick Company
Niles, Ill.

[54] PRINTED SHEETS CONTAINING CONCEALED IMAGES AND METHOD & MATERIALS FOR PREPARATION AND VISUAL DEVELOPMENT OF SAME
11 Claims, 3 Drawing Figs.

[52] U.S. Cl. .................................................. 117/1.7,
35/9 R, 101/426, 101/469, 101/DIG. 1, 106/21, 117/36.2
[51] Int. Cl. ...................................................... B44f 1/10,
B41m 5/12, G09b 3/06
[50] Field of Search ............................................ 117/1.7,
36.2, 36.7; 35/9; 101/426, 469, 470, DIG. 1; 106/21

[56] References Cited
UNITED STATES PATENTS
3,349,408   10/1967   Gillen et al. ................... 346/112
3,363,338   1/1968    Skinner et al. ................ 35/9 X
3,451,143   6/1969    Thomas et al. ............... 35/9
FOREIGN PATENTS
415,535    8/1934    Great Britain ................

*Primary Examiner*—William D. Martin
*Assistant Examiner*—Edward J. Cabic
*Attorney*—McDougall, Hersh, Scott & Ladd ABSTRACT: A system for the preparing of copy containing concealed images and a marking material for the development of same in which the components comprise a receiving material in the form of starch or polyvinyl alcohol, an iodide which is oxidizable to iodine, and an oxidizing agent for oxidizing the iodide in which the oxidizing agent is contained in the imaging material to produce the concealed image, the iodine is contained in the marking material for the development of the image and the starch or polyvinyl alcohol are contained in the copy sheet, the printing material or the marking material whereby, when the marking material is applied to the concealed image, the oxidizing agent oxidizes the iodide to release iodine for producing an intense color with the starch or polyvinyl alcohol and in which the printing process is adapted to conventional printing systems.

INVENTORS
Richard E. Thomas
Robert T. Florence
Rustom H. Dalal
Raymond I. Scheuer
by McDougall, Hersh, Scott and Ladd
Att'ys

PRINTED SHEETS CONTAINING CONCEALED IMAGES AND METHOD & MATERIALS FOR PREPARATION AND VISUAL DEVELOPMENT OF SAME

This invention relates to materials, elements and methods used in informational systems and testing systems embodying concealed or the combination of concealed and visible images and in the preparation and development thereof.

A system of the type described finds utilization in the field that is referred to as concealed image development where use is made thereof in self-instructional material, self-examination and multiple-choice techniques for learning, testing and the like. In self-instructional material, only the image corresponding to the correct answer contains one or more components for visual development when properly marked with a writing substance embodying an additional component or components required for color development to indicate when the correct answer has been marked.

In self-examination and in multiple-choice systems, the same concepts are embodied. For further utilization of these concepts in concealed image development, reference can be made to the copending application Ser. No. 574,743, filed Aug. 24, 1966 and entitled "Spirit Duplication with Visible and Concealed Images," now U.S. Pat. No. 3,451,143.

It is an object of this invention to provide a three-component system for use in the preparation and development of concealed images and it is a related object to provide materials and elements for use in the practice of same, which give wider latitude in the distribution of components and in the utilization thereof in learning or instructional systems, which gives more rapid visible image development and increased color intensity in the developed image, and which provides elements having greater shelf life and stability under widely varying conditions of heat and humidity, and which are capable of use in conventional printing processes for preparation of multiple copies containing the concealed image alone or in combinations with visible images.

These and other objects and advantages of this invention will hereinafter appear and for purposes of illustration, but not of limitation, an embodiment of the invention is shown in the accompanying drawing in which FIG. 1 is a sectional elevational view showing the arrangement of elements in the imaging of a spirit master;

Figure 1:
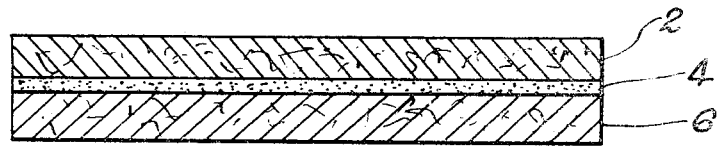

The three-component system of this invention comprises an iodide capable of oxidation to release iodine, an oxidizing agent capable of oxidizing the iodide to yield iodine, and a receiving material which reacts with the released iodine to form an intensely colored product.

The invention will be described with reference to the distribution of the three components of the system in the elements of a spirit duplicating copy process for the production of multiple copies containing a concealed image for subsequent development and a marking material with which the copy sheets can be marked for visible development of the image. It will be understood that the three components can be otherwise distributed in elements for producing multiple copies by other printing processes, such as stencil duplication, lithographic printing, letterpress printing, flexographic printing, gravure printing, screen printing and the like, or by hand stamp, as will hereinafter be defined.

As the iodide, it is preferred to make use of ammonium or an alkali metal iodide, such as potassium iodide, sodium iodide and the like. Since the iodide is embodied in the marking material, use can be made of colored iodide salts capable of being oxidized to release iodine.

As the component with which the released iodine reacts to produce a visible image, use is made of a material that is invisible in the copy sheet and, for such purpose, it is preferred to make use of a starch or polyvinyl alcohol or mixtures thereof, which is invisible when embodied in the desired amounts in the copy sheet.

As the oxidizing agent, it is desirable to make use of material which is invisible in the copy sheet to enable use in defining the invisible image. For this purpose, it is preferred to make use of a soluble salt of copper, such as the chloride, nitrate, sulphate, acetate, lactate, benzoate, or stearate of copper. Use can be made of a double salt $CuCl_2 \cdot KCl$ and cupric ammonium chloride. Instead, use can be made of such other oxidizing agents as copper-m-benzene disulfonate and the like.

Excellent results have been secured from the use of an invisible oxidizing material referred to as "positive halogen" oxidizing agent in which the halogen is attached to nitrogen and which can be represented by trichloromelamine, N-chlorosuccinimide, N-bromosuccinimide, N-chlorophthalimide, monobromantin, diodantin, dibromomethyl ethyl hydantoin, dichloro methyl ethyl hydantoin, N-bromoglutarimide, N-chloroglutarimide, N-haloaminotriazines, "Dichloramine B" (Wyandotte Chemical Company's trademark for N,N-dichlorobenzenesulfonamide), and "Halane" (Wyandotte Chemical Company's trademark for 1,3-dichlor-5,5-dimethyl-hydantoin).

Copper chloride and related salts are highly hygroscopic or deliquescent such that difficulties are sometimes encountered in use under high-humidity conditions of the type prevailing in the southern regions of the United States and on hot and humid summer days. The use of such copper salts can be greatly improved in their stability by the combination with the copper salts of the type previously described. Excellent results are also secured by combination of the copper salts with an amine such as piperidine, piperazine, phenylenediamine, tallowamine, trichloromelamine, triisopropanolamine, melamine, and the like.

For the preparation of copy, in accordance with the preferred practice of this invention, the oxidizing component is embodied in the transfer coating of the transfer sheet for use in imaging a spirit master. The starch or polyvinyl alcohol is embodied in the copy sheet. Since the iodide is subject to slow oxidation in air with corresponding release of iodine and color it is undesirable to embody the iodide either in the copy sheet or the printing material forming the invisible image applied to the copy sheet. Thus the iodide is preferably embodied as a component in the marking fluid with which the imaged copy sheet is marked to develop the visible image when applied to engage the invisible image. In another ramification, the receiving material, such as starch and/or polyvinyl alcohol, can be incorporated with the iodide in the marking material.

Having described the basic concepts of this invention, illustration will now be made by way of an example of the distribution of the elements in the preparation of copy by spirit duplication and in the use thereof to develop the invisible image.

EXAMPLE 1

Copy Paper

In the preparation of the copy paper, it will be sufficient if the copy paper is formulated to contain at least 0.1 percent by weight starch and/or polyvinyl alcohol, although it is preferred to make use thereof in an amount within the range of 0.5 percent to 5 percent by weight of the copy paper. The starch or polyvinyl alcohol can be incorporated for uniform distribution throughout the copy paper by formulation as a component dissolved or dispersed in the slurry or finish of which the paper is formed by conventional papermaking technique. In the preferred practice, the starch and/or polyvinyl alcohol is incorporated into already formed paper by impregnation and preferably by coating the paper with a solution containing from 3–10 percent by weight starch or polyvinyl alcohol in aqueous medium whereby the starch or polyvinyl alcohol is concentrated on the surface of the paper where it is more available for reaction with the released iodine.

EXAMPLE 2

Transfer Sheet

The transfer sheet embodying the oxidizing agent in the transfer coating can be prepared in the conventional manner for the preparation of transfer sheets in spirit duplication. The following is a typical formulation for a transfer coating in which the oxidizing material is incorporated:

EXAMPLE 2a

| | |
|---|---|
| 5-50 | parts by weight oxidizing agent |
| 8 | parts by weight dioctyl phthalate |
| 2.5 | parts by weight ethyl cellulose (Hercules N4) |
| 40 | parts by weight toluene |

EXAMPLE 2b

| | |
|---|---|
| 10 | parts by weight copper chloride |
| 8 | parts by weight dioctyl phthalate |
| 2.5 | parts by weight ethyl cellulose |
| 40 | parts by weight toluene |

EXAMPLE 2c

| | |
|---|---|
| 25 | parts by weight trichloromelamine |
| 8 | parts by weight dioctyl phthalate |
| 2.5 | parts by weight ethyl cellulose |
| 40 | parts by weight toluene |

EXAMPLE 2d

| | |
|---|---|
| 15 | parts by weight copper-m-benzene disulfonate |
| 15 | parts by weight trichloromelamine |
| 8 | parts by weight dioctyl phthalate |
| 2.5 | parts by weight ethyl cellulose |
| 40 | parts by weight toluene |

The materials are ball milled and then coated onto paper at the rate of 10 to 20 pounds per 3,000 square feet of surface area, calculated on a dry weight basis.

As the oxidizing agent in examples 2 and 2b, the copper chloride can be replaced by equivalent amounts of copper nitrate, copper sulphate, copper acetate, copper lactate, copper benzoate, copper-m-benzene disulfonate, $CuCl_2 \cdot KCl$ with the copper salt being present preferably in an amount within the range of 5 to 25 parts by weight. Instead of copper chloride, use can be made of cupric ammonium chloride. Instead of the trichloromelamine in Example 2d, use can be made of other positive halogen such as N-chlorosuccinimide, N-bromosuccinimide, N-chlorophthalimide, monobromantin, diodantin, dibromomethyl ethyl hydantoin, dichloromethyl ethyl hydantoin, N-bromoglutarimide, N-chloroglutarimide, N-haloaminotriazines, "Dichloramine B" (Wyandotte Chemical Company's trademark for N,N-dichlorobenzenesulfonamide), and "Halane" (Wyandotte Chemical Company's trademark for 1,3-dichloro-5,5-dimethylhydantoin), with the positive halogen being present preferably in an amount within the range of 15 to 30 parts by weight.

Instead of the oxidizing agent in examples 2 to 2d, use can be made of a mixture of a copper salt and a positive halogen in the ratio of 1 part by weight copper salt to 0.2 to 2 parts by weight of the positive halogen and preferably within the range of 1 part by weight of the copper salt to 0.5 to 2 parts by weight of the positive halogen. Instead of making use of a copper salt in example 2, use can be made of a mixture of copper salts and an amine such as piperidine, piperazine, phenylenediamine, tallowamine, trichloromelamine, triisopropanolamine, melamine and the like, in the ratio of 1 part by weight copper salt to 0.1 to 2 parts by weight of the amine and preferably 1 part by weight of the copper salt to 0.4 to 2 parts by weight of the amine.

EXAMPLE 3

Marking Material

The following is a typical formulation of a fluid marking material:

| | |
|---|---|
| 1-10 | parts by weight iodide |
| 99-90 | parts by weight water |

The above fluid composition can be modified to embody a marking color, such as 0.0005 to 1 percent by weight of a dyestuff represented by Calcofast Spirit Yellow G. As the iodide, use can be made of potassium iodide, sodium iodide, ammonium iodide, lithium iodide. The amount of iodide is not critical since more or less can be used in the marking material.

EXAMPLE 3a

| | |
|---|---|
| 2% | by weight potassium iodide |
| 97% | by weight water |
| 1% | by weight dyestuff |

Instead of locating the marking iodide in a fluid system, it can be formulated into a wax crayon, pencil or the like element which can be used for marking.

EXAMPLE 4

Preparation of Copy by Spirit Duplication

With reference now to FIG. 1, the transfer sheet 2 is positioned with the transfer coating 4 of example 2 in surface contact with the duplicating surface of a spirit master 6. The spirit master is imaged by transfer of coating from the transfer sheet to the master surface in the normal manner in response to impact or pressure from a die, typewriter key, stylus or pencil, or in response to a heat pattern generated by infrared radiation of an infrared ray absorbing original positioned in surface contact with the transfer sheet. The master may be additionally imaged by a conventional spirit master to provide a master imaged in part with a spirit and alcohol soluble dyestuff from an imaged master having a visible image 8 and an invisible image 10.

Figure 2:
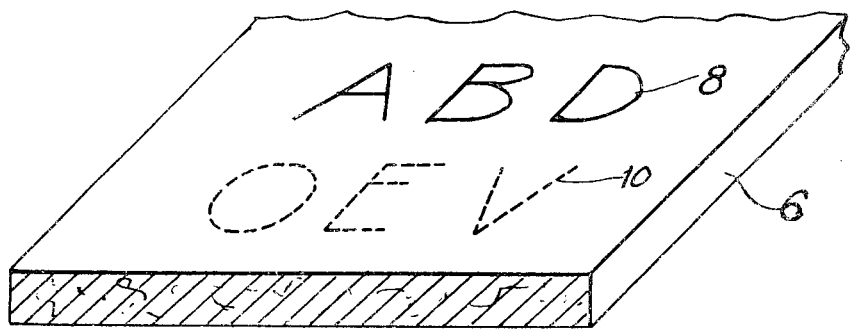
FIG. 2 is a schematic view, partially in section, of the imaged master.
Figure 3:
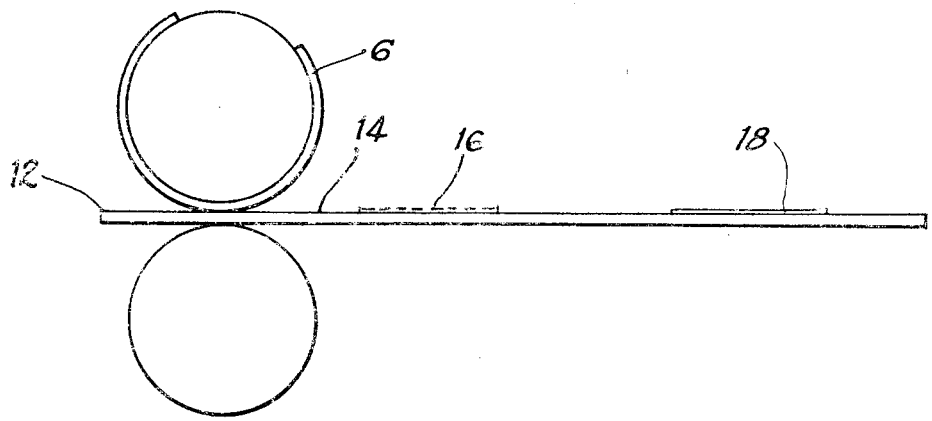
FIG. 3 is a schematic view, partially in section, showing the production of printed copies from the imaged spirit master of FIG. 2.

For the production of copy, as illustrated in FIG. 2, the imaged master 6 is mounted on the cylinder of a conventional spirit duplication machine and copy sheets 12, wetted on one surface 14 with a spirit fluid, are brought into surface contact with the imaged surface of the master whereby some of the imaging materials are leached from the imaged portions of the master for transfer to the copy sheets to produce copies containing an invisible image 16 formed of the oxidizing agent and visible images 18, if the master had an imaged portion containing a dyestuff, or if the copy sheets originally contained a visible image.

Thereafter the copy sheets can be used as a piece of instructional material or test material distributed for use. When in marking the sheet with the marking fluid of example 3, the marking fluid is applied to a nonimaged portion of the sheet, only a color introduced by the marking material to indicate the place that has been marked will show. When the marking material is applied to an invisible image, the iodide in the marking material is immediately oxidized by the oxidizing agent in the invisible image to release iodine and the iodine stains or reacts with the starch to provide a visible image of high color intensity to indicate that the marking material has been applied to a portion of the copy sheet containing the visible image.

Having described the basic concepts of this invention, reference will now be made to the distribution of components for use in other printing processes for producing multiple copies of the sheet printed with the invisible and visible image.

In the lithographic printing process, the oxidizing material will be formulated as a component of the lithographic ink which preferentially wets the imaged portions of the lithographic surface as distinguished from the nonimaged hydrophilic portions which are previously wet with water.

In stencil duplication, the oxidizing agent is formulated in the stencil fluid that is forced through the stencil openings onto the copy sheets to form the invisible image thereon.

In letterpress printing, the oxidizing material will be embodied in the fluid with which the letters of the plate are wet for imprinting the copy sheets.

In gravure printing, the oxidizing material will be formulated into the fluid that is retained in the wells etched into the surface of the plate for transfer to copy paper brought into contact therewith.

In a hand stamp or in silk screen printing, the fluid ink would be formulated to contain the oxidizing agent.

In each of these other processes, the iodide would still be limited to formulation into the marking material with which the printed sheet is marked and by polyvinyl alcohol or starch to be embodied with the oxidizing agent in the printing fluid or with the iodide in the marking material and preferably in the paper on which the copy is produced.

The following example is typical of a printing ink embodying the oxidizing agent for use in a hand stamp:

EXAMPLE 5

| 4 | drops | "Dioxin" preservative (Sindar Corp.) |
| 0.25 | gram | Ammonium alum |
| 9.00 | grams | Gum arabic |
| 3.50 | grams | Penford Gum-200 |
| 0.75 | gram | Formalin |
| 1.00 | gram | Sodium stearate |
| 84.00 | grams | Water |
| 36.5 | grams | Glycerine |
| 10.00 | ml. | n-butanol |
| 0.725 | gram | Trichloromelamine |
| 0.725 | gram | Copper Chloride |

The Penford Gum (starch) is heated and stirred until dissolved or formed into a colloidal dispersion which is then combined with the remainder of the ingredients and dispersed as by means of a ball mill, colloid mill or the like.

The prepared ink composition can be applied to impression or copy paper with a rubber stamp, a silk screen printing process, a jet printing process, or by letterpress. The dried ink images are invisible and development can be accomplished by treating the appropriate areas with a 2 percent aqueous solution of potassium iodide.

In the above formulations, copper-m-benzene disulfonate can be substituted for the trichloromelamine and either the trichloromelamine or copper chloride can be used solely as the oxidizing agent in corresponding amounts. Polyvinyl alcohol or carboxymethylcellulose can be substituted for the Penford gum. The copper chloride or trichloromelamine can be replaced with other copper salts or with a positive halogen oxidizing agent or combination thereof in amounts to constitute 0.5 to 10 percent by weight of the ink.

In the event that some slight color is present in the materials forming the latent image, this can be concealed by the technique of making use of tinted copy or impression paper, preferably of the same tint as the image so as better to conceal the image.

It will be apparent from the foregoing that we have provided a new and improved system for use of concealed images in educational, testing and the like programs whereby an invisible image can be made highly visible when properly marked with an iodide-containing material.

It will be understood that changes may be made in the details of construction, formulation and operation without departing from the spirit of the invention, especially as defined in the following claims.

We claim:

1. The method for imaging copy sheets with a concealed image and visual development of the concealed image comprising the steps of imaging a copy sheet with a printing material selected from the group consisting of a soluble copper salt and a positive halogen organic oxidizing compound and mixtures thereof having no color value to provide a concealed image and in which a receiving material selected from the group consisting of starch and polyvinyl alcohol and mixtures thereof is admixed with the printing material or present as a component in the copy sheet on which the printing material is applied, and subsequently marking the concealed image with a composition containing a soluble iodide which reacts with the material in the concealed image to release iodine which reacts with the receiving material for visual development of the concealed image.

2. The method as claimed in claim 1 in which the copper salt is selected from the group consisting of the chloride, nitrate, sulphate, acetate, lactate, benzoate, or stearate of copper.

3. The method as claimed in claim 1 in which the positive halogen compound is selected from the group consisting of trichloromelamine, N-chlorosuccinimide, N-bromosuccinimide, N-chlorophthalimide, monobromantin, diodantin, dibromethyl ethyl hydantoin, dichloromethyl ethyl hydantoin, N-bromoglutarimide, N-chloroglutarimide and N-haloaminitriazines.

4. The method as claimed in claim 1 which includes with the copper salt or positive halogen compound and an amine selected from the group consisting of piperidine, piperazine, phenylenediamine, tallowamine, trichloromelamine, triisopropanolamine and melamine.

5. The method as claimed in claim 1 in which the iodide is selected from the group consisting of an alkali metal iodide and ammonium iodide.

6. The method as claimed in claim 1 in which the image is printed on the copy sheet by a spirit duplicating process which makes use of a spirit master, a coated transfer sheet, copy sheets and a spirit fluid with which the copy sheets are wet before contact with the spirit master for leaching materials from the image for transfer from the master sheet to the copy sheet, the copper salt or positive halogen compound is a spirit soluble material contained in the transfer coating of the transfer sheet.

7. The method as claimed in claim 6 in which the spirit master is also imaged with a conventional image containing a spirit soluble dye to provide a master for producing a concealed image and a visible image on the copy sheets.

8. The method as claimed in claim 1 in which, when the printing process is a stencil duplicating process, the copper salt or positive halogen compound is contained in the stencil fluid forced through the stencil openings of a stencil sheet onto copy sheets to produce copy containing the concealed image.

9. The method as claimed in claim 1 in which, when the printing process is a lithographic printing process, the copper salt or positive halogen compound is embodied in an oleophilic fluid with which the imaged lithographic plate is wet for transfer of the oleophilic fluid from the imaged areas of the master to copy sheets.

10. The method as claimed in claim 1 in which, when the printing process is a letterpress process, a gravure process, a silk screen printing process, a jet printing process, or a stamp process, the copper salt or positive halogen compound is embodied in the printing ink.

11. A printed copy sheet comprising a visible image portion and a concealed image portion containing a copper salt or positive halogen compound capable of oxidizing an iodide to iodine and in which the concealed image portion contains a material selected from the group consisting of starch and polyvinyl alcohol which is responsive to the released iodine for the development of an intense color.

* * * * *